(12) United States Patent
Takada et al.

(10) Patent No.: US 10,174,711 B2
(45) Date of Patent: Jan. 8, 2019

(54) PISTON FOR INTERNAL COMBUSTION ENGINE

(75) Inventors: Ryotaro Takada, Utsunomiya (JP); Yositaka Tsujii, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 237 days.

(21) Appl. No.: 14/368,844

(22) PCT Filed: Jul. 31, 2012

(86) PCT No.: PCT/JP2012/069464
§ 371 (c)(1),
(2), (4) Date: Jun. 26, 2014

(87) PCT Pub. No.: WO2013/099341
PCT Pub. Date: Jul. 4, 2013

(65) Prior Publication Data
US 2015/0047498 A1  Feb. 19, 2015

(30) Foreign Application Priority Data

Dec. 28, 2011  (JP) ................................. 2011-287561

(51) Int. Cl.
*F02F 3/00* (2006.01)
*F02F 3/10* (2006.01)
(Continued)

(52) U.S. Cl.
CPC .............. *F02F 3/0084* (2013.01); *F02F 3/10* (2013.01); *F16J 1/01* (2013.01); *F16J 1/04* (2013.01);
(Continued)

(58) Field of Classification Search
CPC ..... F02F 3/0084; F02F 3/10; F16J 1/01; F16J 1/04; F16J 1/08; F05C 2201/0421;
(Continued)

(56) References Cited

U.S. PATENT DOCUMENTS 3,497,376 A * 2/1970 Wieser ..................... C10M 7/00
                                                                   204/192.15
3,711,171 A * 1/1973 Orkin ........................ C23C 4/04
                                                                   384/202

(Continued)

FOREIGN PATENT DOCUMENTS

DE       199 19 725     11/2000
DE   10 2005 057 754     6/2006
(Continued)

OTHER PUBLICATIONS

Google translation of DE 102006056427A1: May 2008, Germany, Sepeur-Stefan.*

(Continued)

*Primary Examiner* — Logan Kraft
(74) *Attorney, Agent, or Firm* — Rankin, Hill & Clark LLP

(57) ABSTRACT

A piston that moves reciprocally in the cylinder of an internal combustion engine and has a piston skirt that makes sliding contact with the inner wall of the cylinder. Solid lubrication parts are provided on the sliding-contact surface of the piston skirt. The solid lubrication parts include at least one type of silver, silver alloy, copper, or copper alloy, and at least one type of carbon material or carbide ceramics.

6 Claims, 8 Drawing Sheets

(51) Int. Cl.
*F16J 1/01* (2006.01)
*F16J 1/04* (2006.01)
*F16J 1/08* (2006.01)

(52) U.S. Cl.
CPC ......... *F16J 1/08* (2013.01); *F05C 2201/0421* (2013.01); *F05C 2201/0475* (2013.01); *F05C 2201/90* (2013.01); *F05C 2203/086* (2013.01); *F05C 2203/0808* (2013.01); *F05C 2203/0813* (2013.01); *F05C 2203/0817* (2013.01); *F05C 2203/0821* (2013.01); *F05C 2203/0839* (2013.01); *F05C 2251/14* (2013.01); *F05C 2253/12* (2013.01)

(58) Field of Classification Search
CPC .......... F05C 2201/0475; F05C 2201/90; F05C 2203/0808; F05C 2203/0813; F05C 2203/0817; F05C 2203/0821; F05C 2203/0839; F05C 2203/086; F05C 2253/12; F05C 2253/14
See application file for complete search history.

(56) References Cited

U.S. PATENT DOCUMENTS

| | | | |
|---|---|---|---|
| 4,677,900 A | 7/1987 | Philby | |
| 5,938,864 A * | 8/1999 | Tomikawa | C22C 9/06 148/434 |
| 6,032,570 A | 3/2000 | Koike et al. | |
| 6,546,922 B1 | 4/2003 | Bischofberger | |
| 6,613,453 B2 * | 9/2003 | Sato | B22F 7/04 384/445 |
| 7,287,459 B2 | 10/2007 | Tabata et al. | |
| 7,662,472 B2 * | 2/2010 | Tanaka | F16C 33/201 384/276 |
| 8,220,433 B2 * | 7/2012 | Sasaki | C10M 111/04 123/193.6 |
| 8,541,349 B2 * | 9/2013 | Xiao | C23C 4/06 106/287.35 |
| 9,181,897 B2 * | 11/2015 | Takada | C23C 28/30 |
| 2013/0000592 A1 | 1/2013 | Takada et al. | |

FOREIGN PATENT DOCUMENTS

| | | | |
|---|---|---|---|
| DE | 102006056427 A1 * | 5/2008 | ........... C04B 41/009 |
| EP | 1 479 946 | 11/2004 | |
| JP | 61-43254 | 3/1986 | |
| JP | 02078752 A * | 3/1990 | |
| JP | 08-508324 | 9/1996 | |
| JP | 2005-320934 | 11/2005 | |
| JP | 2007-270206 | 10/2007 | |
| JP | 2010-127142 | 6/2010 | |
| JP | 2014-532845 | 12/2014 | |
| KR | 10-2010-0005738 | 1/2010 | |
| WO | 2011/115152 | 9/2011 | |
| WO | 2013/063342 | 5/2013 | |

OTHER PUBLICATIONS

International Search Report, dated Oct. 2, 2012.
Japanese Office Action with partial English translation dated Feb. 17, 2015, 6 pages.
German Office Action dated Dec. 1, 2016, English translation included, 13 pages.
German Office Action with English Translation dated Feb. 7, 2017, 12 pages.

* cited by examiner

FIG. 4

| MATERIAL CONTAINED IN LUBRICATING DEPOSITS | PROPORTION OF ADDED MATERIALS*1 AND REDUCTION RATIOS OF FRICTIONAL LOSS*2 | | | |
|---|---|---|---|---|
| | 0% (ONLY Ag) | 1% BY WEIGHT | 2% BY WEIGHT | 3% BY WEIGHT |
| Ag + DIAMOND | 6.0 | 7.8 | 8.5 | 9.0 |
| Ag + GRAPHITE | 6.0 | 6.6 | 6.7 | 6.8 |
| Ag + SiC | 6.0 | 6.5 | 6.6 | 6.7 |

*1 Added materials are diamond, graphite, SiC.

*2 $MoS_2$ is used as a benchmark.

PISTON FOR INTERNAL COMBUSTION ENGINE

TECHNICAL FIELD

The present invention relates to a piston that is movable back and forth in a cylinder of an internal combustion engine.

BACKGROUND ART

Automobiles travel by rotation of tires with a rotational drive force converted from a drive force that is generated by an internal combustion engine supplied with fuel. Recently, various attempts have been made to improve the fuel consumption ratio (gas mileage) of internal combustion engines on such automobiles, since the improved fuel consumption ratio reduces the amount of fuel that is consumed, thereby saving energy and protecting the global environment.

One such attempt is directed toward reducing resistance to sliding movement between the inner wall surfaces of cylinders (inner wall surfaces of bores or sleeves) of the internal combustion engine and the pistons that move back and forth in the cylinders. If resistance to sliding movement is reduced, then it becomes easier for the pistons to move back and forth in the cylinders. Therefore, the drive force applied to move the pistons back and forth is reduced, resulting in a reduction in the amount of fuel consumed.

It is known in the art to deposit a layer including a lubricant-rich material on inner wall surfaces of cylinders or piston skirts in order to reduce resistance to sliding movement and to improve the lubrication properties of the inner wall surfaces of the cylinders or the piston skirts. For example, in International Publication No. WO 2011/115152, the present applicant has proposed providing ridges on the sliding surface of a piston skirt and covering the ridges with a lubricating film made of silver, silver alloy, copper, or copper alloy.

As disclosed in International Publication No. WO 2011/115152, it is preferable to interpose an intermediate layer made of a heat-resistant resin material between the film and the piston skirt, so that the film becomes firmly bonded to the piston skirt by the intermediate layer. Specific examples of the heat-resistant resin material include polyimide resin, polyamide-imide resin, epoxy resin, nylon-6 resin, and nylon-6,6 resin, etc.

The existence of the film on the piston of the internal combustion engine is effective to maintain a lubricant suitably between the inner wall surface of the cylinder, e.g., the inner wall surface of the sleeve, and the piston skirt, and to diffuse or transfer frictional heat quickly, so that the piston skirt and the inner wall surface of the cylinder are prevented from becoming adhered to each other.

SUMMARY OF INVENTION

Vehicles that travel in severe environments, such as racing cars or the like, must be powered by highly durable internal combustion engines. For example, the piston for use in an internal combustion engine, as disclosed in International Publication No. WO 2011/115152, should desirably prevent the piston skirt and the inner wall surface of the cylinder from adhering to each other for as long a period of time as possible.

It is a major object of the present invention to provide a piston for use in an internal combustion engine, which is capable of preventing the inner wall surface of a cylinder and a piston skirt from adhering to each other, and which includes a solid lubricator that is less susceptible to wear.

According to an embodiment of the present invention, there is provided a piston for use in an internal combustion engine, which is movable back and forth in a cylinder of the internal combustion engine, and includes a piston skirt in sliding contact with an inner wall surface of the cylinder, comprising:

a solid lubricator disposed on a sliding surface of the piston skirt, wherein the solid lubricator contains at least one of silver, silver alloy, copper, and copper alloy, and at least one of a carbon material and carbide ceramics. According to the present invention, the term "carbide" includes the meaning of a carbonitride that has been carbonized and nitrided.

The solid lubricator, which contains silver, silver alloy, copper, or copper alloy, exhibits excellent intrinsic thermal conductivity, and is not likely to become adhered to the inner wall surface of the cylinder, i.e., an inner wall surface of a sleeve. According to the present invention, at least one of a carbon material and carbide ceramics is added to the metal.

A carbon material such as graphite, carbon nanotubes, carbon black, and diamond, etc., has a much higher thermal conductivity than silver, silver alloy, copper, or copper alloy. Therefore, heat, which is generated by sliding contact between regions of the sliding surface of the piston skirt and the inner wall surface of the cylinder, diffuses easily. Since the carbon material exhibits an excellent lubricating capability, the carbon material reduces resistance to sliding movement of the piston. Such features may be combined in order to reduce frictional loss of the internal combustion engine, and consequently, the piston and the cylinder are less likely to become adhered to each other over a long period of time. The addition of carbide ceramics also is effective to reduce frictional loss of the internal combustion engine.

Even if the internal combustion engine in which the piston is incorporated is mounted on cars that travel in severe environments, such as racing cars or the like, the piston remains highly durable over a long period of time.

Preferred examples of the aforementioned carbide ceramics include silicon carbide (SiC), titanium carbide (TiC), and titanium carbonitride (TiCN), which exhibit excellent wear resistance and have a comparatively large thermal conductivity. Use of carbide ceramics also prevents the solid lubricator from becoming adhered to the cylinder, and makes wear of the solid lubricator less likely.

The solid lubricator may be disposed over the entire sliding surface of the piston skirt. However, since the solid lubricator is made of silver, silver alloy, copper, or copper alloy, if the solid lubricator is applied to the entire sliding surface of the piston skirt, the cost and weight of the piston are increased. Therefore, preferably, the solid lubricator is in the form of line or dot.

Since the total volume of the solid lubricator is reduced in the form of line or dot, the amount of metal, i.e., silver, silver alloy, copper, or copper alloy, contained in the solid lubricator is reduced. Therefore, the cost of the piston is reduced, and the piston for an internal combustion engine is prevented from increasing in weight.

The piston preferably further comprises an intermediate layer interposed between the solid lubricator and the sliding surface of the piston skirt, the intermediate layer containing at least a resin material. In this case, the solid lubricator is firmly bonded to the resin material. Therefore, the intermediate layer is effective to prevent the solid lubricator from dropping off from the sliding surface. Consequently, frictional loss is reduced over a long period of time.

The intermediate layer may further contain a solid lubricant such as $MoS_2$, BN, and graphite, etc., in addition to the resin material. Even if the solid lubricator drops off, thereby exposing the base layer, the solid lubricant contained within the intermediate layer maintains the lubricating capability.

The sliding surface of the piston skirt may include a convexity, wherein the solid lubricator is disposed selectively only on the convexity.

Since the convexities essentially serve as regions that are in sliding contact with the piston as the piston moves back and forth, the solid lubricator, which is disposed only on the convexities, enables the piston to slide sufficiently within the cylinder.

Since lubricating deposits are disposed selectively only on portions that are involved in sliding contact, the amount of metal (silver, silver alloy, copper, or copper alloy) used to form the lubricating deposits is greatly reduced. Therefore, the cost of the piston is lowered. Further, since lubricating deposits are disposed selectively only on the convexities, the weight of the piston is prevented from increasing significantly.

According to the present invention, at least one of a carbon material such as graphite, carbon nanotubes, carbon black, and diamond, etc., and carbide ceramics such as silicon carbide (SiC), titanium carbide (TiC), and titanium carbonitride (TiCN), etc., is contained in the solid lubricator that is disposed on the piston skirt of the piston, and contains at least one of silver, silver alloy, copper, and copper alloy. The solid lubricator exhibits improved thermal conductivity and is more wear-resistant than a solid lubricator made solely of silver, silver alloy, copper, or copper alloy.

Consequently, heat generated by sliding contact between regions of the piston skirt and the inner wall surface of the cylinder is easily spread. The regions in sliding contact are prevented from being heated to a high temperature and from becoming adhered to each other. Therefore, frictional loss of the internal combustion engine is reduced, so that the regions in sliding contact are much less likely to become adhered to each other over a long period of time. Thus, the internal combustion engine is highly durable.

BRIEF DESCRIPTION OF DRAWINGS

FIG. 4 is a table showing a correlation between the types and added ratios of materials contained within a lubricating deposit, and frictional loss reduction ratios;

DESCRIPTION OF EMBODIMENTS

Pistons for use in internal combustion engines (hereinafter also referred to as "pistons") according to preferred embodiments of the present invention will be described in detail below with reference to the accompanying drawings.

Figure 1:
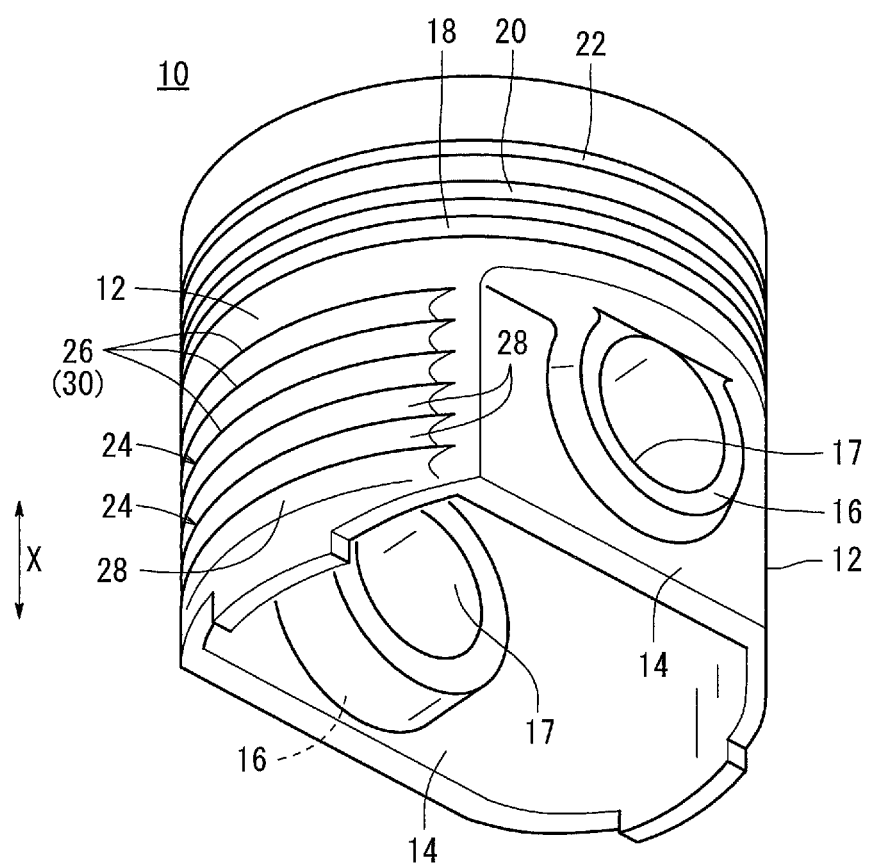
FIG. 1 is a perspective view showing the entirety of a piston according to a first embodiment of the present invention.
Figure 2:
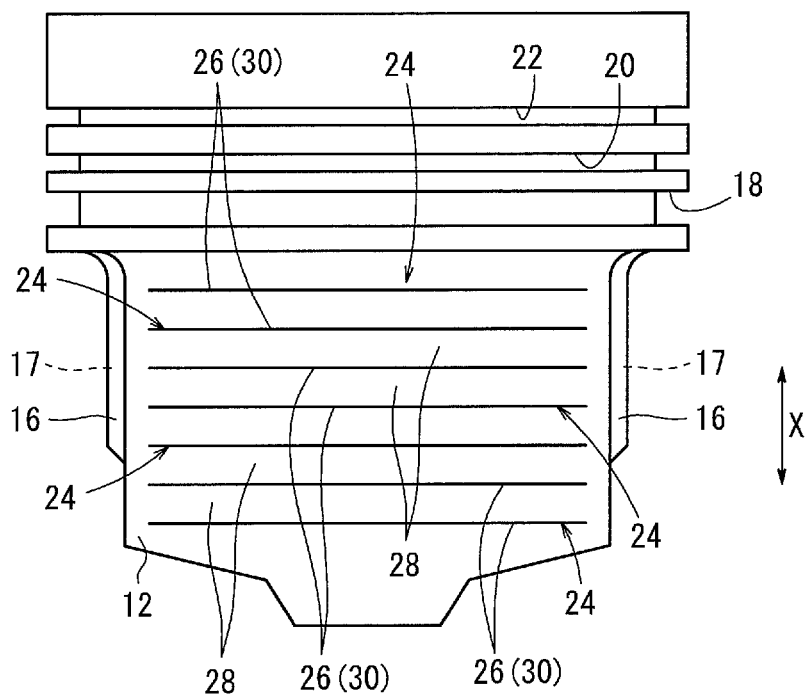
FIG. 2 is a side elevational view of the piston shown in FIG. 1.

FIG. 1 shows in perspective the entirety of a piston 10 according to a first embodiment of the present invention. FIG. 2 shows the piston 10 in side elevation. The piston 10 includes a pair of piston skirts 12, 12 in a lower portion thereof, and a pair of substantially vertically extending walls 14, 14 disposed between the piston skirts 12, 12. The walls 14, 14 have respective pin bosses 16, 16 that project horizontally. The pin bosses 16, 16 have respective piston pin holes 17, 17 defined respectively therethrough for a non-illustrated piston pin that is inserted in the piston pin holes 17, 17. The piston pin extends through a through hole defined in a smaller end of a non-illustrated connecting rod, thereby pivotally supporting the connecting rod on the piston 10.

The piston 10 has an oil ring groove 18, a first piston ring groove 20, and a second piston ring groove 22 defined therein above the piston skirts 12, 12, and which are arranged successively upward in this order. The oil ring groove 18, the first piston ring groove 20, and the second piston ring groove 22 extend circumferentially around an upper end portion of the piston 10.

The piston 10, which is constructed in the foregoing manner, is made of an aluminum alloy such as AC2A, AC2B, AC4B, AC4C, AC4D, AC8H, or A1100 (aluminum alloys defined according to JIS), an Al—Cu alloy, or the like.

Figure 3:
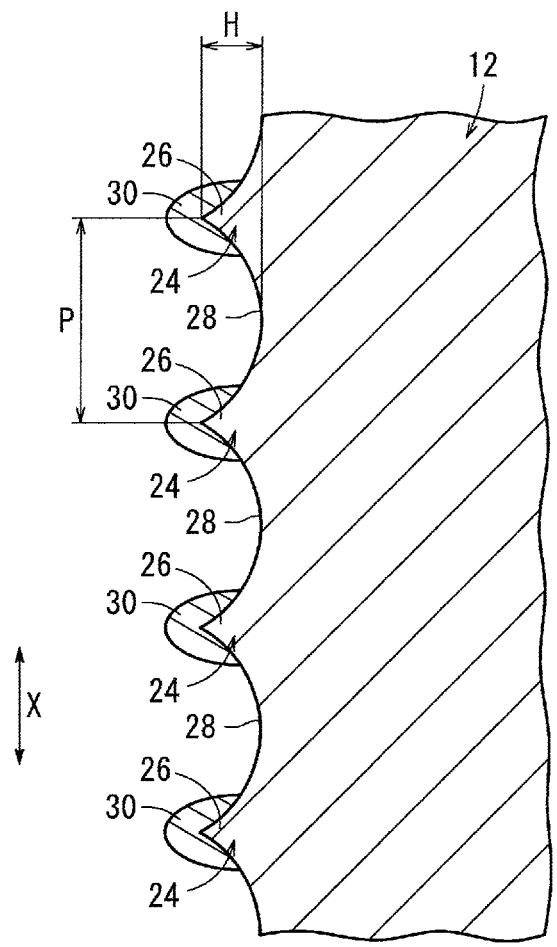
FIG. 3 is an enlarged cross-sectional view of a surface layer region of a piston skirt of the piston.

As shown at an enlarged scale in FIG. 3, according to the first embodiment, the piston skirts 12 have linear marks 24 provided on sliding surfaces thereof. The direction indicated by the arrow X in FIG. 3 corresponds to the direction indicated by the arrow X in FIGS. 1 and 2. The direction indicated by the arrow X in the other figures also corresponds to the direction indicated by the arrow X in FIGS. 1 and 2.

The linear marks 24 are formed by undulations having raised ridges 26 and depressed valleys 28, which are machined circumferentially on the piston skirts 12. Preferably, the ridges 26 (convexities) have a height H in a range from 0.001 to 0.1 mm, and adjacent ones of the ridges 26, 26 are spaced from each other by a distance or pitch P in a range from 0.1 to 0.5 mm. More preferably, the height H lies in a range from 0.008 to 0.012 mm, and the pitch P lies in a range from 0.25 to 0.3 mm.

According to the first embodiment, lubricating deposits 30 are disposed as solid lubricators only on the respective ridges 26 of the linear marks 24. In other words, the lubricating deposits 30 are not disposed in the valleys 28 of the linear marks 24. The lubricating deposits 30 extend linearly along the ridges 26 in the circumferential direction of the piston skirts 12.

The lubricating deposits 30 are composed of a mixture of at least one of silver, silver alloy, copper, and copper alloy, and at least one of a carbon material and carbide ceramics. As shown in FIG. 3, the lubricating deposits 30 are raised from the ridges 26.

Silver, silver alloy, copper, and copper alloy exhibit an excellent lubricating capability when the piston skirts 12 are held in sliding contact with the inner wall surface of a bore, or the inner wall surface of a cylinder sleeve in a cylinder block. Preferred examples of silver alloy include Ag—Sn alloy and Ag—Cu alloy. Preferred examples of copper alloy include Cu—Sn alloy, Cu—Zn alloy, and Cu—P alloy, etc.

The carbon material exhibits a large intrinsic thermal conductivity, and thus, lubricating deposits 30 that contain the carbon material are more thermally conductive than lubricating deposits that are made of any one of silver, silver alloy, copper, and copper alloy. Consequently, when the piston skirts 12 are held in sliding contact with the inner wall surface of the cylinder, the lubricating deposits 30 easily distribute heat that is generated locally by mutual sliding contact between regions of the piston skirts 12 and the cylinder. Thus, the regions of the piston skirts 12 and the cylinder that are in mutual sliding contact are prevented from being heated to high temperatures and from becoming adhered to each other, and are easily ground against each other. Therefore, frictional loss (Psf) of the internal combustion engine is reduced.

One preferred example of the carbon material is carbon having an $SP^2$ hybridized orbital. The carbon may be a crystalline structure, such as graphite, graphene, carbon nanotubes, fullerene, or the like, or may be an amorphous structure, such as carbon black, activated carbon, or the like. A crystalline structure is preferred because the thermal conductivity thereof is comparatively large. Carbon nanotubes are particularly preferred due to having excellent thermal conductivity in a range from about 3000 to 5500 W/(m·K). Alternatively, carbon fibers may be selected as the carbon material.

Another preferred example of the carbon material is diamond having an $SP^3$ hybridized orbital. Diamond exhibits a thermal conductivity in a range from 1000 to 2000 W/(m·K), which is substantially the same as the thermal conductivity of graphite, which is in a range from 900 to 2300 W/(m·K). Further, since diamond is excellent in terms of wear resistance, use of diamond also makes the lubricating deposits 30 excellent in terms of wear resistance.

On the other hand, carbide ceramics also exhibit excellent wear resistance, and thus carbide ceramics are primarily effective to increase the wear resistance of the lubricating deposits 30. The term "carbide" according to the present embodiment also includes the meaning of "carbonitride".

Carbide ceramics having such a function are not limited to any particular materials, but preferred examples thereof include silicon carbide, titanium carbide, molybdenum carbide, zirconium carbide, tantalum carbide, niobium carbide, tungsten carbide, vanadium carbide, hafnium carbide, and carbonitride that is obtained by nitriding any one of the aforementioned carbides.

In particular, among carbide ceramics, silicon carbide exhibits a relatively large thermal conductivity. Therefore, silicon carbide makes the lubricating deposits 30 excellent in terms of wear resistance and thermal conductivity. In addition, since silicon carbide is relatively inexpensive among such carbide ceramics, lubricating deposits 30 made of silicon carbide are low in cost.

Titanium carbide or titanium carbonitride may be selected as suitable carbide ceramics. Since such materials are comparatively easy to obtain, such materials make it possible to produce lubricating deposits 30 that are excellent in terms of wear resistance and relatively low in cost.

The proportion of the carbon material or the carbide ceramics in the lubricating deposits 30 is selected to improve frictional loss of the internal combustion engine, or to make the lubricating deposits 30 sufficiently wear resistant. If the weight of each of the lubricating deposits 30 is given as 100% by weight, then the proportion of carbon material or carbide ceramics should preferably be selected from within a range from 0.5% to 30% by weight. More preferably, a sufficient proportion of the carbon material or carbide ceramics may lie within a range from 0.5% to 5% by weight.

Both carbon materials and carbide ceramics may be used, or silicon carbide or the like, which has a high thermal conductivity, may be selected as a carbide ceramic in order to improve frictional loss of the internal combustion engine, and to ensure that the lubricating deposits 30 are sufficiently wear resistant.

The lubricating deposits 30 are not required to be made of the same mixture, but different lubricating deposits 30 may be constituted from different mixtures, respectively. For example, the ridge 26 of one linear mark 24 may be covered with a lubricating deposit 30 containing silver and silicon carbide, and the ridge 26 of another linear mark 24, which is positioned adjacent to the above linear mark 24, may be covered with a lubricating deposit 30 containing copper alloy and graphite.

The lubricating deposits 30 are not limited to any particular thickness. However, if the thickness of the lubricating deposits 30 is excessively small, then the lubricating deposits 30 become worn in a relatively short period of time, thereby exposing the ridges 26 underneath the lubricating deposits 30. Conversely, if the thickness of the lubricating deposits 30 is excessively large, the lubricating deposits 30 tend to be so heavy that a large force is required to move the piston 10 back and forth. In order to avoid such problems, the thickness of the lubricating deposits 30 should preferably be within a range from 0.5 to 100 μm.

The piston 100 according to the first embodiment is basically constructed as described above. Next, operations and advantages of the piston 10 will be described below.

When the internal combustion engine is assembled and operated, the lubricating deposits 30 are held in sliding contact with the inner wall surface of the cylinder (i.e., an inner wall surface of the cylinder bore or an inner wall surface of the cylinder sleeve) with a lubricating oil interposed therebetween. If the lubricating deposits 30 are held in sliding contact with the inner wall surface of the sleeve, which is made of FC (gray cast iron) or Al, for example, then the sum of the thermal conductivity of the silver, silver alloy, copper, or copper alloy in the lubricating deposits 30 and the thermal conductivity of the sleeve of FC or Al is 350 W/(m·K) or greater. Since the lubricating deposits 30 contain a carbon material, the thermal conductivity of which is higher, or carbon ceramics, the thermal conductivity of which is of the same degree as the above thermal conductivity, the thermal conductivity of the lubricating deposits 30 is greater than if the lubricating deposits 30 were made only of silver, silver alloy, copper, or copper alloy.

Consequently, when the piston skirts 12 are held in sliding contact with the inner wall surface of the cylinder, heat generated locally by mutual sliding contact between regions of the piston skirts 12 and the cylinder is easily spread. Stated otherwise, heat is prevented from remaining in the regions that are in mutual sliding contact. Inasmuch as the regions in mutual sliding contact are prevented from being heated to a high temperature, the regions are prevented from becoming adhered to each other, and are easily ground. Because of this phenomenon, frictional loss (Psf) of the internal combustion engine is reduced.

For example, in comparison with an engine used as a reference, which includes lubricating deposits having a general lubricating film of $MoS_2$, in an internal combustion engine having the piston 10 with lubricating deposits 30 made of silver, the frictional loss thereof is reduced by 6%. Further, if diamond is added to the silver in the lubricating deposits 30, then the reduction ratio of frictional loss increases as shown in FIG. 4 depending on the amount of diamond that is added. In other words, as the amount of added diamond is increased, the frictional loss becomes smaller.

FIG. 4 shows a relationship between amounts of added graphite and silicon carbide, and the frictional loss reduction ratios. It is obvious from FIG. 4 that by adding carbon material or carbide ceramics to silver, the frictional loss of the internal combustion engine having the piston 10 is reduced.

Therefore, the piston 10 can move smoothly back and forth in the cylinder for as long a period of time as possible. The internal combustion engine can be used as a highly durable internal combustion engine on cars that travel in severe environments, such as racing cars or the like, in which the piston 10 moves abruptly back and forth in the cylinder.

Notwithstanding, in this case, the absolute value of the difference between the Young's modulus of the lubricating deposits 30 and the Young's modulus of the sleeve of FC or Al is 10 GPa or greater. According to an investigation conducted by the present inventors, if the absolute value of the difference between the Young's moduli is of a large value, for example 10 GPa, then the lubricating oil can be retained suitably within the small clearance between the sleeve and the piston skirts 12, thereby preventing seizure from occurring between the sleeve and the piston skirts 12.

In general, silver or silver alloy tends to be highly expensive and heavy. Therefore, if a film made of silver or silver alloy is disposed entirely over the sliding surfaces of the piston skirts 12, then the cost and weight of the piston is increased. In contrast, according to the present embodiment, the lubricating deposits 30 are disposed selectively only on the ridges 26. Therefore, the amount and cost of the metal, e.g., silver, silver alloy, copper, or copper alloy, that is used in the lubricating deposits 30 is reduced. Further, since the lubricating deposits 30 are disposed only on the ridges 26, the piston 10 is prevented from becoming unduly increased in weight.

Since the lubricating deposits 30 essentially serve as sliding contact regions of the piston skirts 12, the lubricating deposits 30, which are disposed selectively only on the ridges 26, enable the piston 10 to slide sufficiently within the cylinder.

As described above, inasmuch as the lubricating deposits 30 are disposed selectively only on the ridges 26, the piston 10 is low in cost, is prevented from increasing in weight, and can slide sufficiently within the cylinder.

The lubricating deposits 30 may be provided on the sliding surfaces of the piston skirts 12 in the following manner.

First, fine particles of silver, silver alloy, copper, or copper alloy, which preferably have an average particle diameter ranging from 1 to 80 nm, and more preferably from 30 to 80 nm, or stated otherwise, nanoparticles of silver, silver alloy, copper, or copper alloy, are dispersed in a dispersion medium such as terpineol, nonanol, ethylene glycol, propylene glycol monomethyl ether acetate, methyl ethyl ketone, or the like.

At least one of a carbon material, such as graphite, carbon nanotubes, carbon black, diamond, or the like, and a carbide ceramic material, such as silicon carbide, titanium carbide, titanium carbonitride, or the like, is added to the dispersion medium, thereby preparing a paste having a viscosity of about 10 cp. A dispersant or the like may also be added to the paste.

Thereafter, the piston skirt 12 is coated with the paste by a known coating process, such as a screen printing process, a pad printing process, or the like.

At this time, the valleys 28 of the linear marks 24 are covered with a screen. Therefore, the paste is prevented from being applied to the valleys 28, and is applied selectively only to the ridges 26, which are formed as convexities.

Next, the paste is heated together with the piston 10 to a temperature that preferably resides within a range from 160 to 240° C. The dispersion medium in the paste is volatilized, whereupon the nanoparticles become fused together. In other words, the paste is sintered into lubricating deposits 30, which are in the form of a sintered body made up of nanoparticles. Since the paste is applied only to the ridges 26, the lubricating deposits 30 are formed selectively only on the ridges 26.

By using nanoparticles, the paste can be sintered in a relatively low temperature range from 160 to 240° C., thereby forming films on the ridges 26. Consequently, the piston skirts 12, which are made of aluminum alloy, are prevented from being heated to a high temperature, and hence the mechanical strength of the piston skirts 12 and other properties thereof are prevented from being adversely affected.

Instead of providing the ridges 26 as linear marks 24 in the form of convexity, according to a modification of the first embodiment, a resin may be used to provide a convexity.

Figure 5:
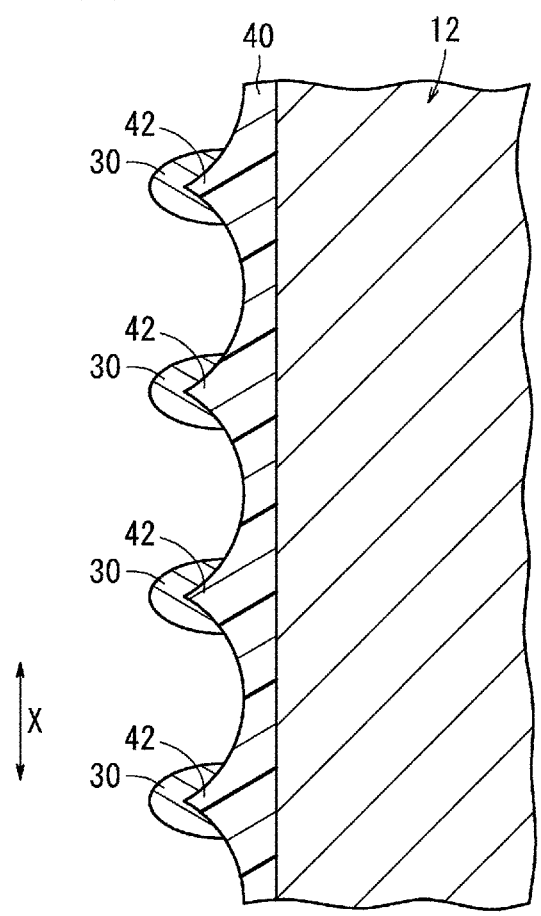
FIG. 5 is an enlarged cross-sectional view of a surface layer region of a piston skirt of a piston, according to a modification of the first embodiment.

Such a modification is shown in cross section at an enlarged scale in FIG. 5. More specifically as shown in FIG. 5, each of the piston skirts 12 includes a flat sliding surface, with a resin layer 40 being fixed to the flat sliding surface. The resin layer 40 has a plurality of linear convexities 42 that extend circumferentially along the sliding surface. The convexities 42 become progressively wider toward bottom ends thereof near the piston skirt 12, and progressively narrower toward top ends thereof remote from the piston skirt 12. The linear convexities 42 provide linear mark configurations, which are similar to the linear marks 24.

The resin layer 40 (convexities 42) preferably are made of a type of resin that increases the bonding strength between the lubricating deposits 30 and the piston skirt 12. Preferred examples of such resins include polyimide resin, polyamide-imide resin, epoxy resin, nylon-6 resin, and nylon-6,6 resin, etc.

According to the above modification, since the convexities 42, which are made of resin, are interposed between the sliding surface of the piston skirt 12 and the lubricating deposits 30, the amount of silver, silver alloy, copper, or copper alloy used in the lubricating deposits 30 is reduced. As a result, the cost of the piston 10 is reduced, and the weight of the piston 10 can be prevented from increasing significantly.

When the lubricating deposits 30 are formed according to the above modification, preferably, a dispersion medium is used for producing the paste, which is capable of swelling the convexities 42 (resin) that are interposed between the sliding surface of the piston skirt 12 and the lubricating deposits 30. Specific examples of such a dispersion medium include N-methylpyrrolidone, polyvinylpyrrolidone, trichloroethylene, and carbon tetrachloride, etc.

In this case, when the paste is applied to the convexities 42 in order to form lubricating deposits 30, the resin is swollen by the action of the dispersion medium, thereby resulting in a mutually mixed layer in which silver particles are dispersed at an interface between the resin and the paste. The mutually mixed layer produces an anchoring effect between the convexities 42 and the lubricating deposits 30. Therefore, the bonding strength of the lubricating deposits 30 with respect to the convexities 42 is further increased.

A second embodiment will be described below. Constituent elements of the second embodiment, which are the same as those shown in FIGS. 1 through 3 and 5, are denoted by identical reference characters, and such features will not be described in detail below.

Figure 6:
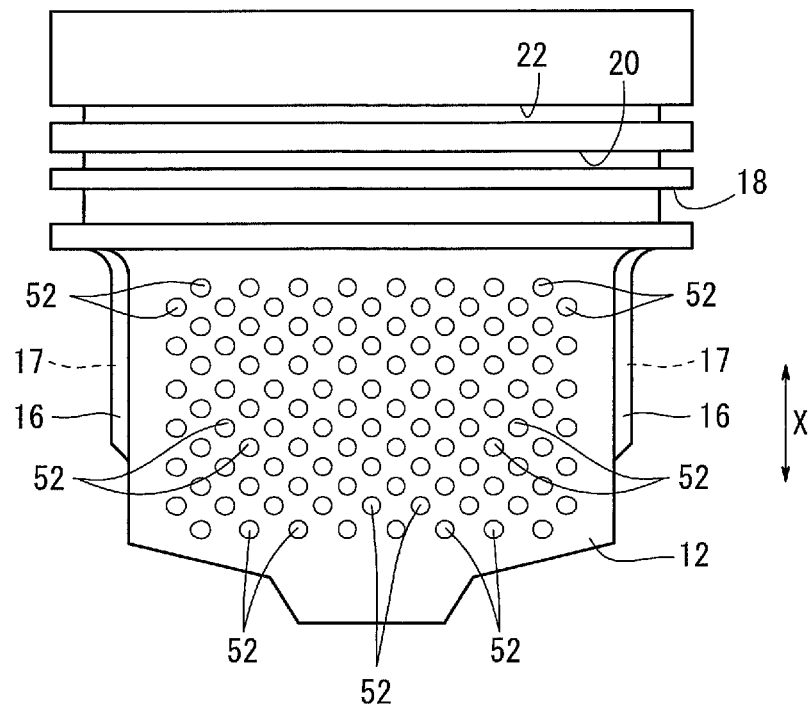
FIG. 6 is a side elevational view of a piston according to a second embodiment of the present invention.

FIG. 6 shows in side elevation a piston 50 according to the second embodiment. The piston 50 comprises lubricating deposits 52 in the form of plural dots, which are provided on the sliding surface of each of the piston skirts 12. Similar to the first embodiment, the lubricating deposits 52 contain at least one of silver, silver alloy, copper, and copper alloy as a metal, and at least one of a carbon material, such as graphite, carbon black, diamond, or the like, and a carbide ceramic, such as silicon carbide, titanium carbide, titanium carbonitride, or the like.

Figure 7:
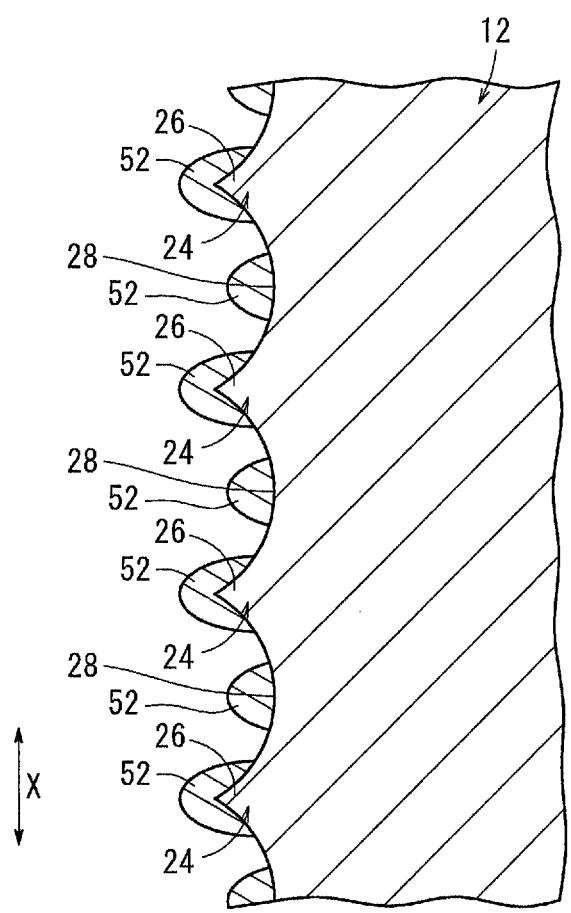
FIG. 7 is an enlarged cross-sectional view of a surface layer region of a piston skirt of the piston shown in FIG. 6.

Although not illustrated in FIG. 6, for facilitating understanding of the present embodiment, the piston skirt 12 has linear marks 24 according to the second embodiment, which are shown at an enlarged scale in FIG. 7. The lubricating deposits 52 are disposed randomly, regardless of whether the lubricating deposits 52 are positioned on the convexities (ridges 26) or the valleys 28 of the linear marks 24. Stated otherwise, according to the second embodiment, the positions of the lubricating deposits 52 are not limited to the ridges 26 (convexities).

However, according to the second embodiment, inasmuch as the lubricating deposits 52 are disposed in the form of a dot, the volume of each of the lubricating deposits 52 is small. More specifically, according to the first embodiment, the lubricating deposits 30 are disposed only in positions that are involved in actual sliding contact, so that the amount of metal (silver, silver alloy, copper, or copper alloy) used is reduced. On the other hand, according to the second embodiment, the volume of each of the lubricating deposits 52 is reduced, and hence the total volume of the lubricating deposits 52 is reduced, thereby reducing the amount of metal used.

According to the second embodiment, similar to the first embodiment, the cost of the piston 50 is reduced, and the weight of the piston 50 can be prevented from increasing significantly.

In order to produce the lubricating deposits 52 in the form of dots, prescribed locations on the piston skirt 12 may be covered with a screen, and a known coating process, such as a screen printing process, a pad printing process, or the like, may be carried out.

Further, the linear marks 24 need not necessarily be provided. More specifically, the piston skirt 12 may have a flat sliding surface, and spot-like lubricating deposits 52 may be disposed on the flat sliding surface. In this case, recesses that are defined between the lubricating deposits 52, 52 serve to hold the lubricating oil.

Furthermore, according to a modification of the second embodiment, an intermediate layer may be interposed between the sliding surface of the piston skirt 12 and the lubricating deposits 52.

Figure 8:
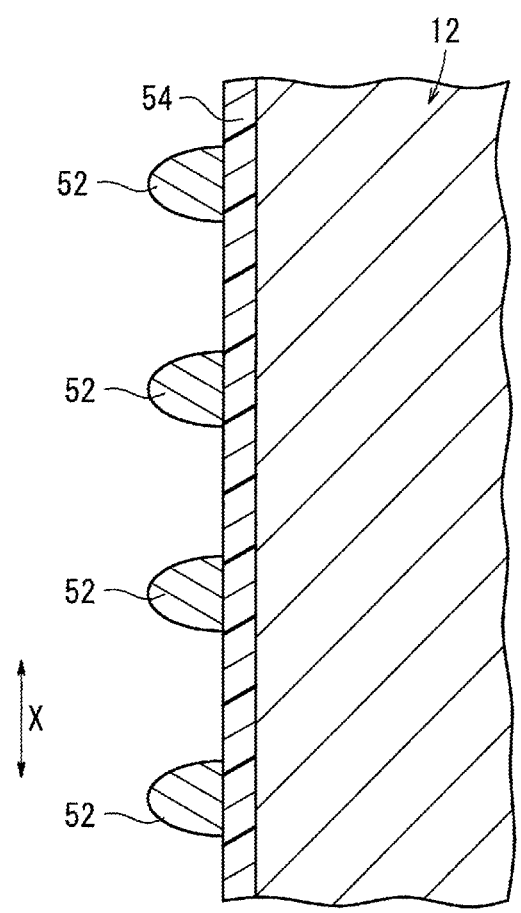
FIG. 8 is an enlarged cross-sectional view of a surface layer region of a piston skirt of a piston, according to a modification of the second embodiment.

According to the modification of the second embodiment, as shown in cross section at an enlarged scale in FIG. 8, the flat sliding surface of the piston skirt 12 is covered in its entirety with an intermediate layer 54, with spot-like lubricating deposits 52 being disposed on the intermediate layer 54.

The intermediate layer 54 may contain a resin material and a solid lubricant. Stated otherwise, the intermediate layer 54 may comprise a mixed layer including a lubricating inorganic material and the above-described resin.

The solid lubricant may be of a known nature. Preferred examples of the solid lubricant include molybdenum disulfide ($MoS_2$), boron nitride (BN), and graphite (C), etc. The intermediate layer 54 is effective to increase the bonding strength between the lubricating deposits 52 and the piston skirt 12. Even if the intermediate layer 54 is brought into sliding contact with the inner wall surface of the cylinder, the solid lubricant is capable of maintaining the lubricating capability.

As described above, while the intermediate layer 54 maintains the lubricating capability, or increases the bonding strength between the lubricating deposits 52 and the piston skirt 12, the amount of metal that is used to produce the lubricating deposits 52 is reduced. As a result, the cost of the piston 50 is reduced, and the weight of the piston 50 can be prevented from increasing significantly.

In addition, any one of the inorganic material and the resin is inexpensive and lightweight. Therefore, even if the entire sliding surface of the piston skirt 12 is covered with the intermediate layer 54, the cost of the piston 50 is prevented from increasing significantly, and an excessive increase in the weight of the piston 50 is prevented. If the entire sliding surface of the piston skirt 12 is covered with the intermediate layer 54, the coating process is easier to perform than if the intermediate layer 54 is formed selectively on portions of the sliding surface of the piston skirt 12.

The present invention is not limited to the embodiments described above, and various changes and modifications may be made to such embodiments without departing from the scope of the invention.

For example, according to the second embodiment, the lubricating deposits 52 may be disposed in the form of dots only on the ridges 26 of the linear marks 24. More specifically, portions of the ridges 26, which extend circumferentially on the sliding surface of the piston skirt 12, may be covered with the lubricating deposits 52 in the form of dots.

Similar to the modification of the first embodiment, the intermediate layer 54 may be provided in the form of linear marks. In this case, the lubricating deposits 52 may be provided in the form of dots on crests of the linear marks.

According to the modification of the second embodiment, the entire sliding surface of the piston skirt 12 is covered with the intermediate layer 54. However, the intermediate layer 54 may be provided in the form of dots or lines selectively on portions of the sliding surface of the piston skirt 12, and the lubricating deposits 52 may be provided selectively only on the intermediate layer 54 that is provided in the foregoing manner.

The invention claimed is:

1. A piston for use in an internal combustion engine, which is movable back and forth in a cylinder of the internal combustion engine, and includes a piston skirt in sliding contact with an inner wall surface of the cylinder, the piston comprising:
   a solid lubricator disposed on a sliding surface of the piston skirt, wherein the solid lubricator is a sintered body consisting of a silver metal and at least one of a carbon material and carbide ceramics,
   a proportion of the at least one of the carbon material and carbide ceramics with respect to 100% by weight of the solid lubricator is 0.5% to 30% by weight, and a remainder of the solid lubricator is the silver metal,
   the piston is made of an aluminum alloy, and
   a the sliding surface of the piston skirt includes ridges which define peaks and valleys, and the solid lubricator is disposed only on the peaks.

2. The piston according to claim 1, wherein the carbide ceramics includes SiC, TiC, or TiCN.

3. The piston according to claim 1, wherein the solid lubricator is in a form of a line or a dot.

4. The piston according to claim 1, further comprising: an intermediate layer interposed between the solid lubricator and the sliding surface of the piston skirt, the intermediate layer containing at least a resin material.

5. The piston according to claim 4, wherein the intermediate layer contains a solid lubricant.

6. The piston according to claim 5, wherein the solid lubricant includes at least a material selected from a group consisting of molybdenum disulfide, boron nitride, and graphite.

\* \* \* \* \*